US009361536B1

(12) United States Patent
Howe et al.

(10) Patent No.: US 9,361,536 B1
(45) Date of Patent: Jun. 7, 2016

(54) IDENTIFYING USER MARKS USING PATTERNED LINES ON PRE-PRINTED FORMS

(71) Applicant: Xerox Corporation, Norwalk, CT (US)

(72) Inventors: Richard L. Howe, Webster, NY (US);
 Eric M. Gross, Rochester, NY (US);
 Dennis L. Venable, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/571,753

(22) Filed: Dec. 16, 2014

(51) Int. Cl.
| H04N 1/38 | (2006.01) |
| H04N 1/387 | (2006.01) |
| G06K 15/02 | (2006.01) |
| G06K 9/00 | (2006.01) |
| G06K 9/34 | (2006.01) |
| G06K 9/46 | (2006.01) |
| G06K 9/60 | (2006.01) |
| G06K 9/78 | (2006.01) |
| G06K 9/80 | (2006.01) |
| H04N 1/00 | (2006.01) |

(52) U.S. Cl.
CPC ............ *G06K 9/346* (2013.01); *G06K 9/00852* (2013.01); *G06K 9/4638* (2013.01); *G06K 9/60* (2013.01); *G06K 9/78* (2013.01); *G06K 9/80* (2013.01); *G06K 15/1869* (2013.01); *G06K 15/1889* (2013.01); *H04N 1/00331* (2013.01); *H04N 1/38* (2013.01); *H04N 1/387* (2013.01); *G06K 2209/01* (2013.01); *H04N 2201/0094* (2013.01)

(58) Field of Classification Search
None
See application file for complete search history.

(56) References Cited

U.S. PATENT DOCUMENTS

| 4,292,622 A * | 9/1981 | Henrichon, Jr. ....... G06K 9/346 382/177 |
| 4,633,502 A * | 12/1986 | Namba ................... G06K 9/346 382/177 |
| 5,004,896 A | 4/1991 | Serrell et al. |
| 5,140,139 A | 8/1992 | Shepard |
| 5,666,549 A * | 9/1997 | Tsuchiya ........... G06K 9/00449 715/223 |
| 5,717,794 A * | 2/1998 | Koga ................. G06K 9/00442 382/177 |
| 5,822,455 A * | 10/1998 | Sano ..................... G06K 9/346 382/202 |
| 5,859,929 A * | 1/1999 | Zhou ..................... G06K 9/346 382/175 |
| 5,898,795 A * | 4/1999 | Bessho .................. G06K 9/346 382/173 |
| 6,741,738 B2 | 5/2004 | Taylor |
| 6,976,161 B2 | 12/2005 | Nelson et al. |
| 7,233,697 B2 * | 6/2007 | Mizutani .................. G06K 9/34 382/178 |
| 7,480,410 B2 * | 1/2009 | Hashimoto ............ G06K 9/342 382/182 |
| 8,452,133 B2 * | 5/2013 | Oba ....................... G06K 9/346 382/202 |

(Continued)

*Primary Examiner* — Scott A Rogers
(74) *Attorney, Agent, or Firm* — Gibb & Riley, LLC (57) ABSTRACT

Methods, devices, and systems replace solid lines of user-fillable areas of a print job with patterned lines and then print the print job with the patterned lines to print user-fillable pre-printed forms, using a printing device. These methods, devices, and systems also scan at least one of the user-fillable pre-printed forms having user markings to produce a scan, using an optical scanner. Further, such methods, devices, and systems produce an altered scan by removing only the patterned lines from the scan to leave the user markings in the altered scan using the image processor. Then, these methods, devices, and systems can identify user-supplied characters by performing automated character recognition on the user markings in the altered scan using the image processor and output such user-supplied characters from the image processor.

16 Claims, 8 Drawing Sheets

(56) References Cited

U.S. PATENT DOCUMENTS

| | | |
|---|---|---|
| 8,542,411 B2 | 9/2013 | Sisco |
| 8,794,978 B2 | 8/2014 | Koyama et al. |
| 2010/0091109 A1 | 4/2010 | Diamandis et al. |
| 2011/0135209 A1* | 6/2011 | Oba ............... G06K 9/346 382/224 |
| 2011/0235128 A1 | 9/2011 | Sisco |
| 2011/0286669 A1* | 11/2011 | Hagisawa ......... G06K 9/00449 382/182 |
| 2012/0063684 A1 | 3/2012 | Denoue et al. |
| 2015/0052426 A1* | 2/2015 | Wu ............... G06K 9/00449 715/255 |

* cited by examiner

IDENTIFYING USER MARKS USING PATTERNED LINES ON PRE-PRINTED FORMS

BACKGROUND

Systems and methods herein generally relate to printing and scanning systems/methods and more particularly to identifying user marks using patterned lines on pre-printed forms.

Existing mark lifting technology is a technology that attempts to "lift" or extract handwriting or other hand-written marks from a digital scan of a page or other surface on which someone has made the marks, and is performed usually for the purpose of then processing the lifted marks to "read" them via intelligent character recognition (ICR) technology. Mark lifting technology usually requires that the person doing the handwriting make their marks inside a box. The box demarcates where the lifting software will look for the marks and is usually printed on the page on which the person makes their marks.

This requirement to keep all of the marks inside the box can be difficult and/or unnatural for a person if they usually write on a line, especially for text that normally goes below the line because, to keep all of the marks inside the box, the user needs to write the characters "floating" inside the box. A technological problem exists with such systems because, even if a line (to write or draw on) is printed inside the box, the mark lifting technology that separates that line from the person's marks results in the removal of a significant amount of the person's marks in the vicinity of the line being removed. This distorts the person's marks and thus leads to poor quality ICR results.

SUMMARY

The systems and methods print any lines or other features that need to be inside the mark lifting box (for the purpose of providing a line to write on, or for any other purpose) not as solid lines or features, but rather print them as patterned lines that can be identified by the mark lifting software as being distinct from any marks the person might make, thus making the two easier to separate without removing much of the person's marks. This alleviates the requirement for the person to write in a "floating" manner and it leaves more of the person's marks in the scan for subsequent processing, thus potentially improving ICR quality.

More specifically, exemplary methods herein create pre-printed forms having patterned lines in user-fillable areas, or replace solid lines of user-fillable boxes of a pre-printed form with patterned lines (e.g., pixel patterns, geometric patterns, etc.). These methods then print the pre-printed forms with the patterned lines using a printing device. In some implementations, this causes the patterned lines printed on the user-fillable pre-printed forms to be distinguishable from the solid lines only by a machine, and for the patterned lines printed on the user-fillable pre-printed forms to be indistinguishable from the solid lines by the unaided human eye of the user (observer). In other implementations, the patterned lines are replaced in such a way that they can be distinguished from the original lines by a user but are still useful for the purpose of guiding where the person will write, or for any other purpose they might be there.

These methods also scan at least one of the user-fillable pre-printed forms that have user markings thereon to produce a scan, using an optical scanner. Further, after scanning, such methods alter the scan to produce an altered scan by removing only the patterned lines from the scan to leave the user markings in the altered scan using the image processor; and this process leaves portions of the user markings that cross the patterned lines in the altered scan.

More specifically, this pre-printed form removal processing (e.g., form lifting, form filtering, etc.) only removes lines that are made solely of the patterned lines from the scan, and leaves all other markings in the altered scan. Therefore, if a user has added a mark that intersects a patterned line (such that the area of the scan in question contains both patterned lines and other (e.g., user-supplied marks) that area of the scan will not be removed and will be allowed to remain in the altered scan. In this way, these methods only remove the pre-printed form from the scan, and do not remove any portion of the marks added to the form after printing.

Then, these methods can identify user-supplied characters by performing automated character recognition on the user markings in the altered scan using the image processor and output such user-supplied characters from the image processor.

Such processing is useful because these methods involve replacing original lines with other patterned lines when processing the print job, which avoids the associated problems of removing portions of user marks that cross or intersect pre-printed form lines. Further, because these methods perform a relatively low resource consumption process of identifying a qualifying mark (e.g., a solid line) and replacing such a mark in the print job with a patterned line prior to printing, these methods simplify processing, increase processing speed, decrease storage requirements (leaving more memory available for other processing), etc.; and in this way, improve the technical operation of the image processor.

Other exemplary methods herein provide electronic instructions (either manual or automated) to an image processor to cause the image processor to replace solid lines of user-fillable areas of a form-based print job with patterned lines. Such methods provide electronic instructions to a printing device to cause the printing device to print the form-based print job with the patterned lines (to print user-fillable pre-printed forms). These methods then receive a scan of at least one of the user-fillable pre-printed forms having user markings thereon into the image processor and provide electronic instructions to the image processor alter the scan produced during scanning (to produce an altered scan) by removing only lines having the patterned lines from the scan, so as to leave the user markings in the altered scan. Then, these methods provide electronic instructions to the image processor to identify user-supplied characters by performing automated character recognition on the user markings in the altered scan, and provide electronic instructions to the image processor to output the user-supplied characters.

Also, systems herein include an image processor replacing solid lines of user-fillable areas of a form-based print job with patterned lines. A printing device is operatively (meaning directly or indirectly) connected to the image processor. The printing device prints the form-based print job with the patterned lines (to print user-fillable pre-printed forms). An optical scanner is also operatively connected to the image processor. The optical scanner scans at least one of the user-fillable pre-printed forms having user markings thereon to produce a scan. The image processor, after scanning, alters the scan to produce an altered scan by removing only lines having the patterned lines from the scan, so as to leave the user markings in the altered scan. The image processor identifies user-written characters by performing automated character recognition on the user markings in the altered scan, and then outputs the user-written characters.

Devices herein include a communications device operatively connected to a processor and to external devices. The processor replaces solid lines of user-fillable areas of a form-based print job with patterned lines. The communications device provides electronic instructions to a printing device to cause the printing device to print the form-based print job with the patterned lines to print user-fillable pre-printed forms. The communications device receives a scan of at least one of the user-fillable pre-printed forms having user markings thereon from an optical scanner. The processor, after scanning, alters the scan to produce an altered scan by removing only lines having the patterned lines from the scan and leaving the user markings in the altered scan. The processor also identifies user-written characters by performing automated character recognition on the user markings in the altered scan. The processor outputs the user-written characters.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, mark lifting technology that separates a line from the person's marks often results in the removal of a significant amount of the person's marks in the vicinity of a pre-printed form line being removed, and this distorts the person's marks and thus leads to poorer quality ICR results. Therefore, the systems and methods herein print the guiding lines, as well as the box boundary lines, not as solid lines but as patterned lines that are programmed to be recognized by the mark lifting software, and thus be removed without affecting the person's marks.

Figure 1:
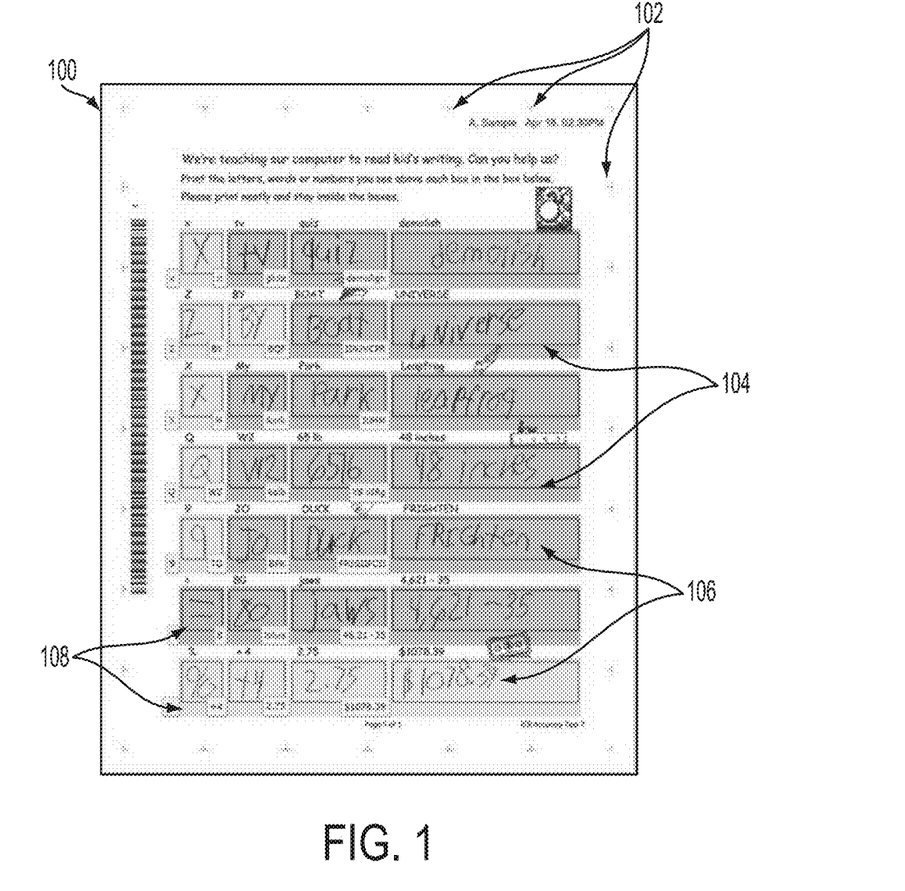
FIG. 1 is a diagram of a scan of a pre-printed form with user markings thereon.

FIG. 1 shows a scan of a pre-printed form 100 with user markings 106 thereon and an overlay added showing bounding boxes 108, etc. Two specific user markings 106 are shown post-line removal in FIGS. 2 and 3 (which are slightly different than they appear in FIG. 1), which are discussed below. Reference numeral 102 points to registration (alignment) marks used to align the scanned image to a frame of reference (e.g., page coordinate system). Reference numeral 104 points to a pre-printed form box line in/on which a user provides handwritten input or marks 106 (e.g., with a pen, pencil, other hand writing instrument, typewriter, stamp, etc.).

Reference numeral 108 points to a bounding box (sometimes called a "hot box") that is a box that demarcates where the lifting software will look for user-added marks 106. In some situations, boxes 104 and 108 are the same box. The bounding boxes 108 are shown using different shading in FIG. 1, but may or may not be visible on the pre-printed form, and the different shading may be added to the scanned image after scanning to indicate a characteristic (such as a correct or incorrect answer within a box 104, etc.). Often, the solid, straight printed lines 104 of the pre-printed guide box are made with dimensions slightly smaller than the actual, theoretical edge (e.g., bounding box 108) of where the software will be looking for the writing/marks, something that is done to account for potential registration errors.

In one instantiation of mark lifting technology, the software knows where to look for the hot box through a combination of two things based on a previously stored pre-printed form (e.g., in a pre-printed form library). First, the paper on which the person writes has, around the periphery of the paper, registration marks 102 printed (that, in this example, are in the form of plus signs, but could be any types of marks). Once the page has been written on and scanned, the software looks for these marks 102 and uses them to form a coordinate system for the page. Second, the locations of each hot box 108 relative to a theoretically-perfect page coordinate system are pre-programmed into the electronic description or "model" of the page (e.g., based on a previously stored template of how the pre-printed form should have printed and scanned, assuming no printing or scanning errors/distortions). Once the software has found the registration marks 102 and established the coordinate system it then knows where (relative to that coordinate system) each hot box 108 is supposed to be located. It is this methodology that means it is possible to not have to print the border of each hot box 108 on the page since the software is not actually looking for printed boxes. But, again, usually the boundary of the hot boxes 108—or a box 104 slightly within that boundary—are printed to help guide the person making the marks on the page.

If the person makes marks outside of the hot box 108 in which the software is looking for them then, since the software can only lift the marks that are inside the hot box, all marks outside of the hot box 108 will not be lifted and thus any subsequent processing of the lifted marks, such as ICR, will likely suffer a degradation in quality. If the person's markings intersect part of the box boundary, then since that boundary is removed during preprocessing, a portion of the person's markings will be removed as well. This is shown in FIGS. 2-5 where reference numerals 116 point to all white pixel portions of the user's markings that are removed from the scan when the pre-printed box lines 104 are removed.

Figure 2:
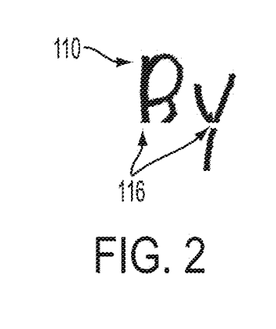
FIG. 2 is a diagram of a scan of a portion of a pre-printed form with user markings thereon and pre-printed form markings removed.
Figure 3:
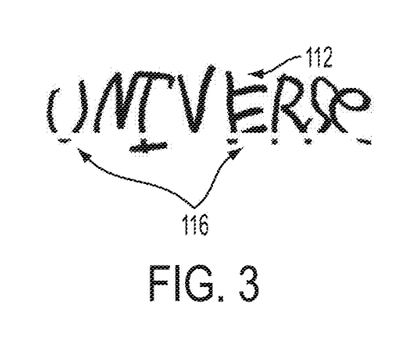
FIG. 3 is a diagram of a scan of a portion of a pre-printed form with user markings thereon and pre-printed form markings removed.

Specifically, in FIG. 2, the word "By" 110 is corrupted when the pre-printed box lines 104 are removed (areas pointed to by reference numeral 116) in such a way that the "B" may be interpreted incorrectly as an "R" and the "y" as a "v." Similarly, in FIG. 3, the word "universe" 112 intersects the horizontal bottom line 104. After removal of the horizontal bottom line 104, as shown by the areas pointed to by reference numeral 116, the majority of the characters will have been corrupted, thus making it more difficult for ICR to properly recognize the characters.

In order to avoid the above technical problem conventionally, the person doing the writing on the pre-printed form is required to write or make their marks fully inside the boundary of the hot box. However, especially for people like younger students (say, in the early elementary grades), this means that unless a line is printed in the box they will have to write or make their marks "floating" in the box, which is more difficult to do and typically is the opposite of how they are taught to write. So, sometimes guidelines (also represented by item 104 in the drawings) are printed in the hot box to make the writing experience for the person more natural. These guidelines 104 are typically solid lines and are usually black (although the systems, devices, and methods herein work with monochrome and color pre-printed forms).

While such guidelines 104 help the person doing the writing or making the marks, the guidelines 104 present a problem for mark lifting since they must be "removed" before the image is passed on for further mark lift processing. Typically, this is done by including the theoretical location of the line 104 in the "model" of the page and then, once the coordinate system for the page has been determined from the registration marks, subtracting the theoretical location of the line from the image. However, when this is done, the subtraction is typically done using a rectangular zone that is a bit wider than the theoretical width of the line 104. This is done to account for the fact that registration errors may be present (due to where the registration marks were actually printed, where the line was actually printed, dimensional changes in the paper, and/or dimensional or geometric errors when the page is scanned) so that the system is sure the line has been fully removed. The technical problem with this, however, is that in the process of removing the line 104, the parts of the writing or marks made by the person or student that falls in the removal rectangle (areas pointed to by reference numeral 116) are also removed.

Figure 4:
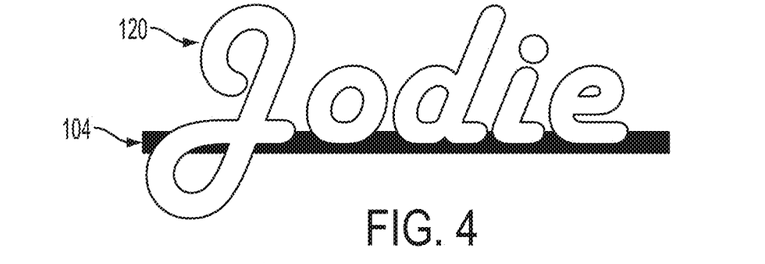
FIG. 4 is a diagram of a scan of a portion of a pre-printed form with user markings thereon.
Figure 5:
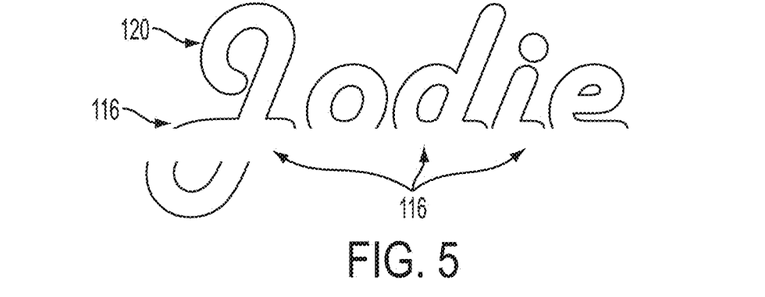
FIG. 5 is a diagram of a scan of a portion of a pre-printed form with user markings thereon and pre-printed form markings removed.

As shown in the example of the handwritten word "jodie" 120 in FIGS. 4 and 5, the removal of the line 104 (shown in FIG. 4) results in both the line 104 and portions of the characters of the word "jodie" 120 being removed as shown by item 116 in FIG. 5 (e.g., results in all white pixels in areas of the scanned image pointed to by reference numeral 116). This technical problem of eliminating all markings from the areas pointed to by reference numeral 116 is particularly problematic for letters that normally go below the line (g, j, p, q, and y) since those letters look much less like letters (especially to ICR technology) once part of their mid-sections are removed, and thus subsequent ICR quality is greatly degraded.

Figure 6:
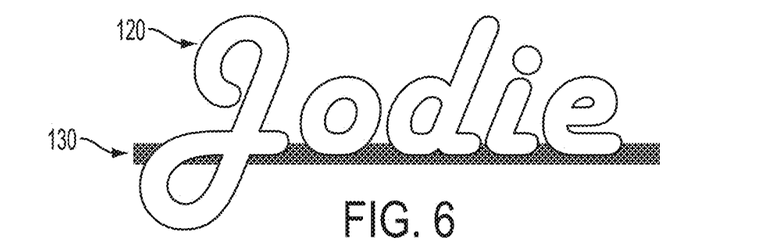
FIG. 6 is a diagram of a scan of a portion of a pre-printed form with user markings thereon.
Figure 7:
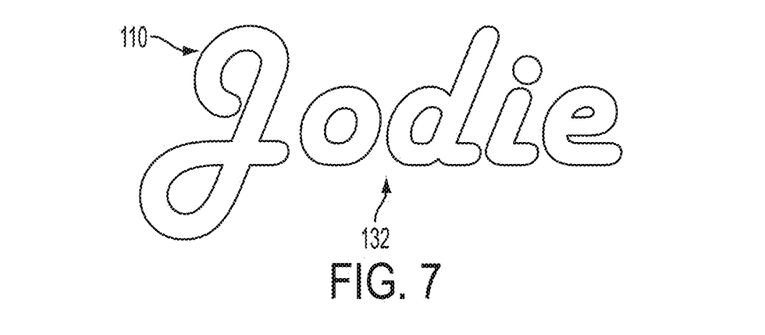
FIG. 7 is a diagram of a scan of a portion of a pre-printed form with user markings thereon and pre-printed form markings removed.
Figure 8:
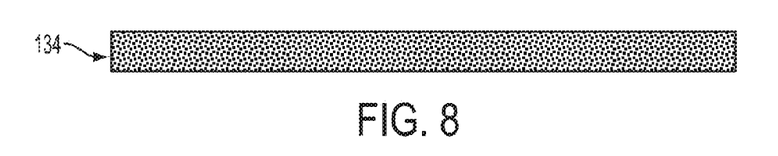
FIG. 8 is a diagram of a patterned line.
Figure 9:
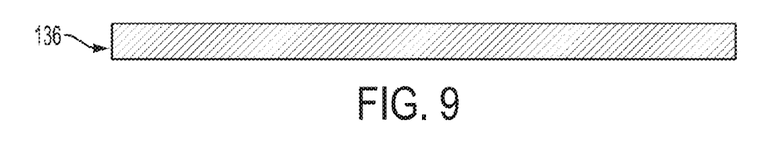
FIG. 9 is a diagram of a patterned line.
Figure 10:
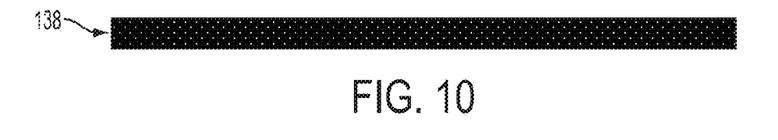
FIG. 10 is a diagram of a patterned line.
Figure 11:
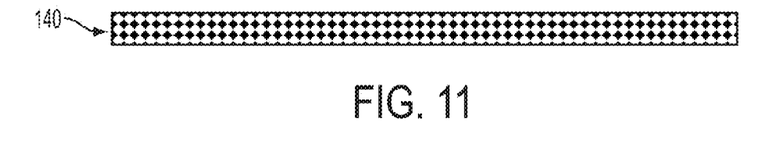
FIG. 11 is a diagram of a patterned line.

The systems, devices, and methods herein solve the aforementioned technical problems by printing the within-hot box guiding lines, as well as the hot box boundary lines (both represented by item 104 in the drawings) not as solid lines but as patterned lines (pointed to by reference numeral 130 in FIG. 6) that can be programmed to be recognized by the mark lifting software (and thus be removed before the person's marks are actually lifted, as shown by reference numeral 132 in FIG. 7). These patterns are automatically recognized wherever they are actually located without having to rely directly on the page coordinate system and pre-programmed, theoretical feature locations as in the conventional systems.

The patterns themselves could be of any form so long as they can be made dark enough to appear the same as solid lines 104, or at least be easily visible lines on the printed page, and can be programmed to be recognized by software after it has been scanned.

For example, different exemplary patterned lines 130 are shown using reference numerals 134, 136, 138, and 140 in FIGS. 8-11. As shown in FIGS. 8-11 any pattern of markings (e.g., pixel patterns 134, line patterns 136, patterns of white pixels on contrasting background 138, geometric patterns 140, etc.) can be used for the lines 104 on the pre-printed forms 100. Depending upon the density of the pattern, the patterned lines 130 printed on the user-fillable pre-printed forms may be indistinguishable from the conventional solid lines 104 by the unaided human eye of the user (observer), as shown by patterned line 138 in FIG. 10, for example. Any of the patterns shown in FIGS. 8-11 are machine-readable or machine-identifiable and distinguishable from user markings because the patterned lines 130 can contain regular repeating features, while the user markings will not contain regular repeating features, but will be solid lines or markings of inconsistent density. For example, the regularly repeating pixel patterns in 134 and 138 or the regularly repeating lines or shapes in 136 and 140 will not occur in user markings, allowing a machine to distinguish such patterned lines 130 from user marks 120.

A specific pixel pattern of the patterned lines 130 can be easily distinguished from the actual person's writing or marks because the user's marks would not contain a pattern, but are solid lines. Therefore, such patterned lines 130 are removed by the methods and devices herein without affecting any solid lines.

As an alternative to identifying a regular repeating pattern of the patterned lines 130, the user markings can be distinguished from the pre-printed lines based on pixel density (which avoids the need for the lines 130 to have regular repeating patterns, and such lines 130 may simply be of a different density than the user's markings). Therefore, the average pixel mark density within an input box or pre-printed sheet can be calculated. Areas that have a density below a specified threshold can be considered white space or space in which the line exists, and therefore a space that does not intersect the person's marks. Areas that have a density above the specified threshold can be considered user marks and so are retained. The threshold can be determined in-situ by computing the density in areas in which the patterned line(s) exist but in which the person's marks are highly unlikely such as near the corners of the sheet. Various morphological transformations can also be applied to optimize the line removal process for the given application.

Therefore, while some implementations include a separate line-removal process (e.g., item 158) such processing can be avoided if the result is based upon pixel density alone. Therefore in non-line-removal implementations, it is possible to replace the solid hot spot lines with a patterned line that does not have to be searched for and removed, because the patterned line is low enough in density that user marks will never be completely obscured by the lines, and therefore the lifted marks will still be mostly complete. An example is replacing the solid lines with a widely-spaced dotted line (e.g., 134, FIG. 8). The guiding effect is still there, but very little of a user mark is degraded because of the lower pixel density of the patterned line (relative to the relatively higher pixel density of the user's marks). Hence, in some situations, no actual removal processing (158) is utilized, depending upon the accuracy of recognition desired.

The systems, devices, and methods allow for guidelines to be present in the hot box, thus enabling people to write or mark on those lines just as they likely have been taught to do and/or are naturally used to doing. Note that not having lines to write on is found to be not very useful and, therefore, pre-printed forms will generally present the user lines or boxes on or in which to supply their markings. Also, these systems, devices, and methods enable the printed guide box for each hot box to be printed inside the actual confines of the hot box and, if the marks are made outside of these printed guide boxes but still inside the hot box itself, the removal of these printed guide boxes will not have any detrimental impact on the user's markings. Further, by having just the pattern itself be recognized for removal, only the patterned lines are removed, rather than removing an enlarged zone that is believed to cover where the line or guide box exists, which leaves much more of the actual writing or marks after the patterned lines are removed, thus enabling much better ICR results.

Figure 12:
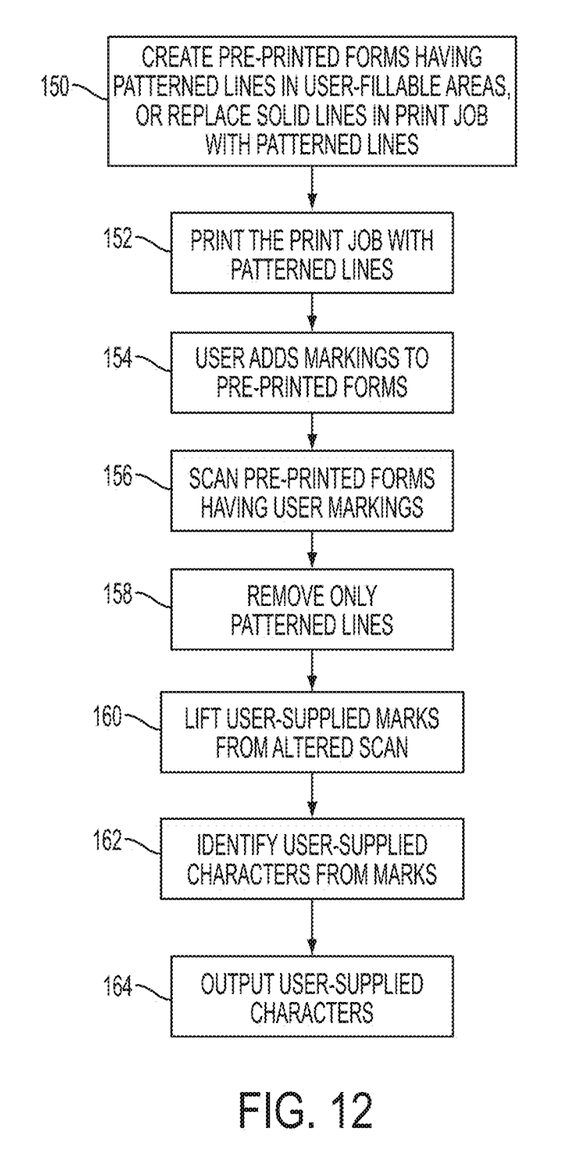
FIG. 12 is a flow diagram of various methods herein.

FIG. 12 is flowchart illustrating exemplary methods herein. In item 150, these methods create pre-printed forms having patterned lines in user-fillable areas, or replace solid lines of user-fillable areas of a print job with patterned lines (e.g., pixel patterns, geometric patterns, etc.) either in the library of previously created printable forms, or automatically, potentially in real time when processing a print job containing solid lines of user-fillable areas (e.g., using an image processor).

The creation/replacement in item 150 can be done in a number of different ways. For example, a user can select such lines on a graphic user interface, and manually select the lines to be patterned lines when creating a new form, or change the lines of user-fillable areas in an existing form from solid lines to patterned lines using menu options and controls of the graphic user interface (and subsequently save the new or modified form in the form library for future use). Subsequently, a user can retrieve such a form the library, can print the form without having to alter the form, and add markings to the form.

Alternatively, in item 150, the image processor can automatically alter a previously prepared form or print job containing solid lines of user-fillable areas by automatically identifying a certain category of lines (e.g., straight black (or other color) lines having a specific width (e.g., being between a minimum width and a maximum width), that are longer than a minimum length, that are certain distance from the border of the document, etc.). Different line selection criteria are utilized for different implementations of the methods herein with the goal of only replacing lines that border user-fillable areas (e.g., only lines 104 in FIG. 1).

In other words, in order to only automatically replace lines that are in user-fillable areas, the solid lines that are automatically selected for replacement can be limited to straight lines only (e.g., for user-fillable boxes) and/or curves having a specific curvature (e.g., for user-checkable circles or ovals) to prevent other aspects of the pre-printed forms from being distorted (such as instructions, logos, text, etc.). Similarly, in other options, the lines that are replaced can be limited by minimum width, length, parallelism to a page edge, color, etc., again to prevent other aspects of the pre-printed forms from being undesirably altered with patterned lines.

Once in the appropriate lines are automatically identified, they are automatically replaced with patterned lines that match the length, width, etc., of the lines that were removed. Such automatic line replacement in item 150 can be performed on all pre-printed form-type print jobs currently existing in a library, eliminating the need for any operator to manually select which lines get replaced, and what type of lines are used as the replacement patterned lines.

In item 152, such methods print the print job with the patterned lines to print user-fillable pre-printed forms using a printing device. This causes the patterned lines printed on the user-fillable pre-printed forms to have the same dimensions as the solid lines that the patterned lines replace and to be located in the user-fillable areas.

In some implementations, this processing in item 150-152 causes the patterned lines printed on the user-fillable pre-printed forms to be distinguishable from the solid lines only by a machine, and for the patterned lines printed on the user-fillable pre-printed forms to be indistinguishable from the solid lines by the unaided human eye of the user (observer). In other implementations, the patterned lines are replaced/printed in such a way that they can be distinguished from the original lines by a user but are still useful for the purpose of guiding where the person will write, or for any other purpose they might be there. See the examples shown in FIGS. 8-11, discussed above.

After printing the user-fillable pre-printed forms in item 152, the user supplies markings (e.g., handwritten, typed, etc.) to the user-fillable pre-printed forms in item 154 using pens, pencils, crayons, typewriters, stamps, etc. As shown in item 156, these methods also scan at least one of the user-fillable pre-printed forms having user markings to produce a scan, using an optical scanner.

Further, in item 158 after scanning in item 156, such methods alter the scan that is produced in item 156 to produce an altered scan by removing only the patterned lines from the scan to leave the user markings in the user-fillable areas 108 of the altered scan using the image processor; and this process in item 158 leaves portions of the user markings that cross the patterned lines in the altered scan (shown by item 132 in FIG. 7, for example). Using the example shown in FIG. 1, the processing in item 158 only removes lines 104 (which have been replaced with patterned lines 130 in item process item 150) leaving the user markings 106 as the only marks in the user-fillable areas 108.

More specifically, this pre-printed form removal processing (e.g., form lifting, form filtering, etc.) in item 158 only removes the unaltered patterned portions of the patterned lines from the user-fillable areas, and leaves all other markings that do not match the pattern in the user-fillable areas of the altered scan. Therefore, if a user has added a mark over a patterned line (such that the area of the scan in question contains both patterned lines and other (e.g., user-supplied, user-written, user-typed, etc.) marks, that area of the scan will not be removed because it no longer matches the unaltered pattern of the patterned line, and will be allowed to remain in the altered scan.

In other words, the processing in item 158 looks for a specific pattern or pixel density (the pattern or pixel density of the pattern lines) and only removes that pattern/density from the scan. Regions where the user has added marks that cross the patterned line will disrupt or change the pattern (or density) and such regions will not be removed from the scan (because the pattern/density of the patterned line no longer matches the pattern/density being removed once a user mark is added to the patterned line). In this way, these methods only remove the pre-printed form lines from the scan, and do not remove any portion of the relatively higher pixel density marks added by the user to the pre-printed form after printing.

Then, in item 160, these methods can lift the full, unaltered user marks from the altered scan. In item 162, these methods identify user-supplied characters by performing automated character recognition on the user markings remaining in the user-fillable areas 108 of the altered scan using the image processor and, in item 164, these methods output such automatically identified user-supplied characters from the image processor. Character lifting from pre-printed forms and automatic character recognition processes are well-known, and are not discussed herein for brevity and reader focus.

Again, because all aspects of the pre-printed form in the user-fillable areas 108 are removed in item 158 without affecting the user markings (allowing the user markings to remain as unbroken, continuous markings) when the user markings are subsequently lifted from the altered scan in item 160, the full, unaltered, continuous user markings are lifted (removed for subsequent processing) increasing the accuracy of the character recognition 162. Note, that lines and other printed items in areas outside the user-fillable areas 108 do not need to be patterned because the lifting and handwriting recognition program only looks to the user-fillable areas 108 when acquiring (lifting) and interpreting the user markings. Further, while the removal of the patterned lines is shown as a separate step in item 158 for ease of understanding and description, it can be performed with the lifting 160 and identification of the user-supplied marks 162, as a single step. For example, if lines 104 within the user-fillable areas that are below a previously established density are ignored in the mark lifting process 160, items 158 and 160 are essentially performed together. In other implementations, items 158 and 160 can be performed as distinct processes.

Such processing is useful because these methods replace original lines with other patterned lines when processing the print job, which avoids the associated problems of removing portions of user marks that cross or intersect pre-printed form lines. Further, because these methods perform a relatively low resource consumption processes of identifying a qualifying mark (e.g., a solid line) and replacing such a mark in the print job with a patterned line prior to printing, these methods simplify processing, increase processing speed, decrease storage requirements (leaving more memory available for other processing), etc., and in this way, improve the technical operation of the image processor.

Stated in an alternative manner, the flowchart in FIG. 12 illustrates methods that provide electronic instructions to an image processor to cause the image processor to replace solid lines of user-fillable areas of a form-based print job with patterned lines (150). Such methods provide electronic instructions to a printing device to cause the printing device to print the form-based print job with the patterned lines to print user-fillable pre-printed forms (152). These methods then receive a scan of at least one of the user-fillable pre-printed forms having user markings thereon into the image processor (156) and provide electronic instructions to the image processor to alter the scan to produce an altered scan by removing only the patterned lines from the scan, so as to leave the only user markings in the user-fillable areas of the altered scan (158). Then these methods provide electronic instructions to the image processor to identify user-supplied characters by performing automated character recognition on the user markings in the altered scan (162, 164), and provide electronic instructions to the image processor to output the user-supplied characters (164).

The hardware described herein plays a significant part in permitting the foregoing method to be performed, rather than function solely as a mechanism for permitting a solution to be achieved more quickly, (i.e., through the utilization of a computer for performing calculations). Specifically, printers, scanners, and image processors that alter electronic documents each play a significant part in the methods (and the methods cannot be performed without these hardware elements). Therefore, these hardware components are fundamental to the methods being performed and are not merely for the purpose of allowing the same result to be achieved more quickly.

As would be understood by one ordinarily skilled in the art, the processes described herein cannot be performed by human alone (or one operating with a pen and a pad of paper) and instead such processes can only be performed by a machine. Specifically, processes such as printing, scanning, electronically altering documents using an image processor, etc., require the utilization of different specialized machines. Therefore, for example, the printing/scanning performed by the user device cannot be performed manually (because it can only be done by printing and scanning machines) and is integral with the processes performed by methods herein. In other words, these various machines are integral with the methods herein because the methods cannot be performed without the machines (and cannot be performed by humans alone).

Additionally, the methods herein solve many highly complex technological problems. For example, as mentioned above, conventional systems that interpret handwritten marks on pre-printed forms suffer from loss of portions of the handwritten characters when the lines of the preprinted form are removed from scans. Methods herein solve this technological problem by utilizing patterned lines that, when removed from scans, do not remove any portions of the handwritten characters, which dramatically increases the accuracy of the character recognition processes.

Figure 13:
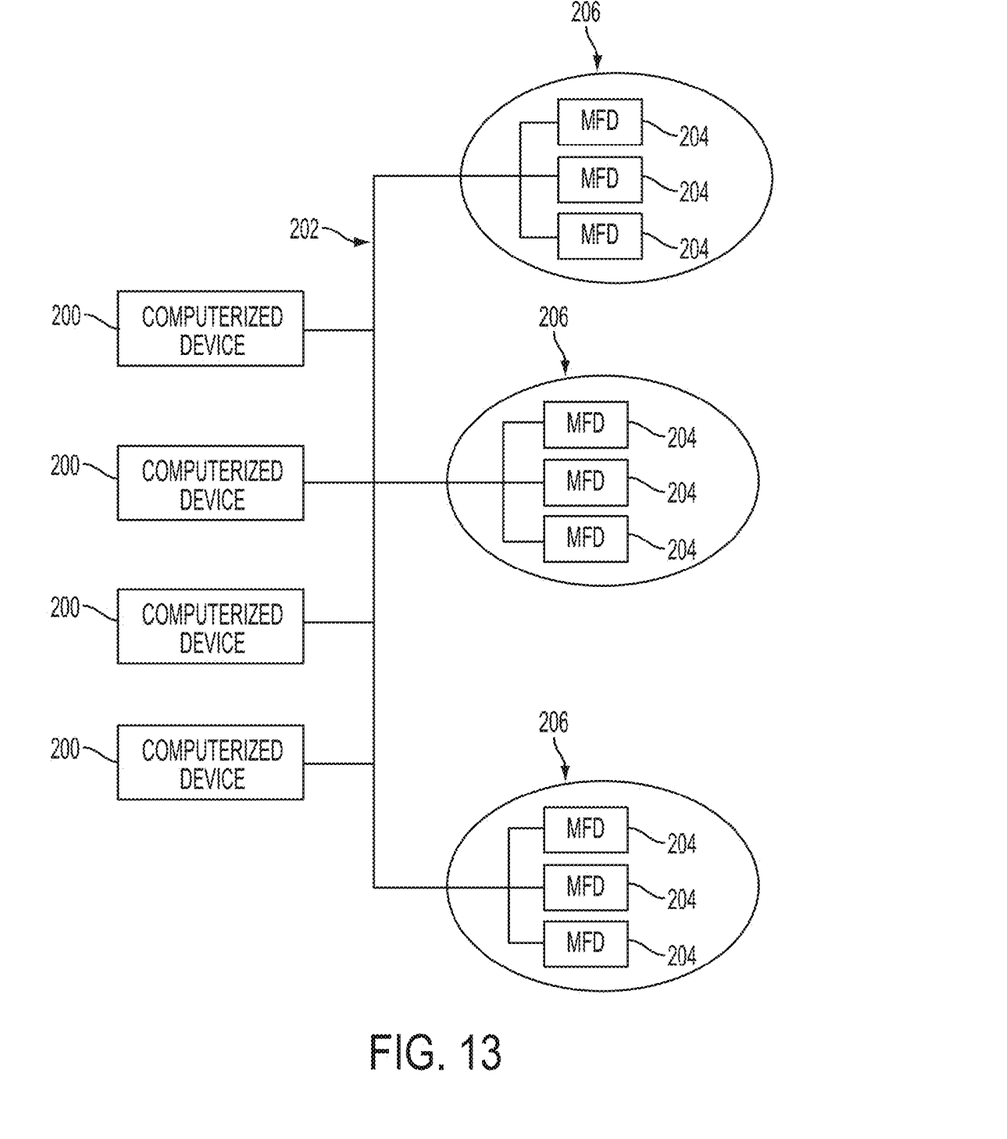
FIG. 13 is a schematic diagram illustrating systems herein.

As shown in FIG. 13, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 14:
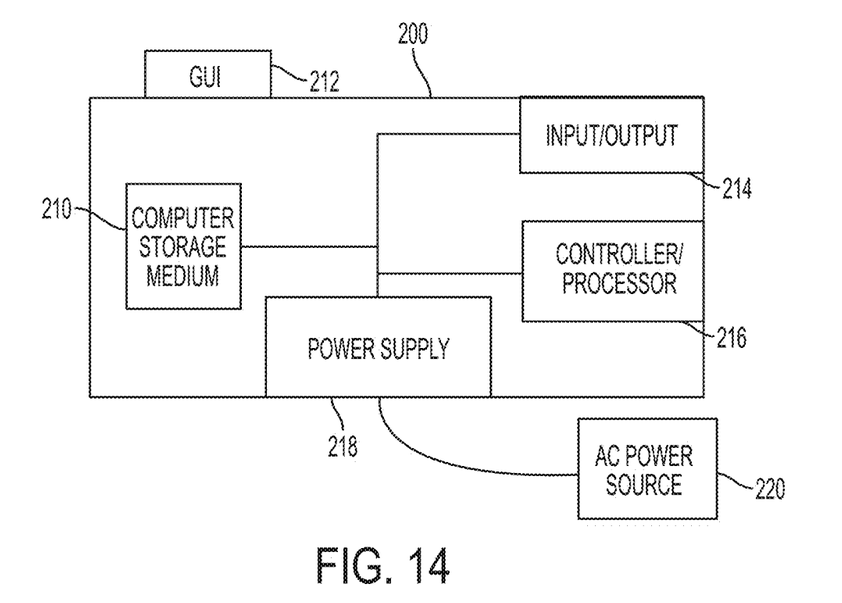
FIG. 14 is a schematic diagram illustrating devices herein.

FIG. 14 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 14, a body housing has one or more functional components that operate on power supplied from an alternating current (AC) source 220 by the power supply 218. The power supply 218 can comprise a common power conversion unit, power storage element (e.g., a battery, etc), etc.

Figure 15:
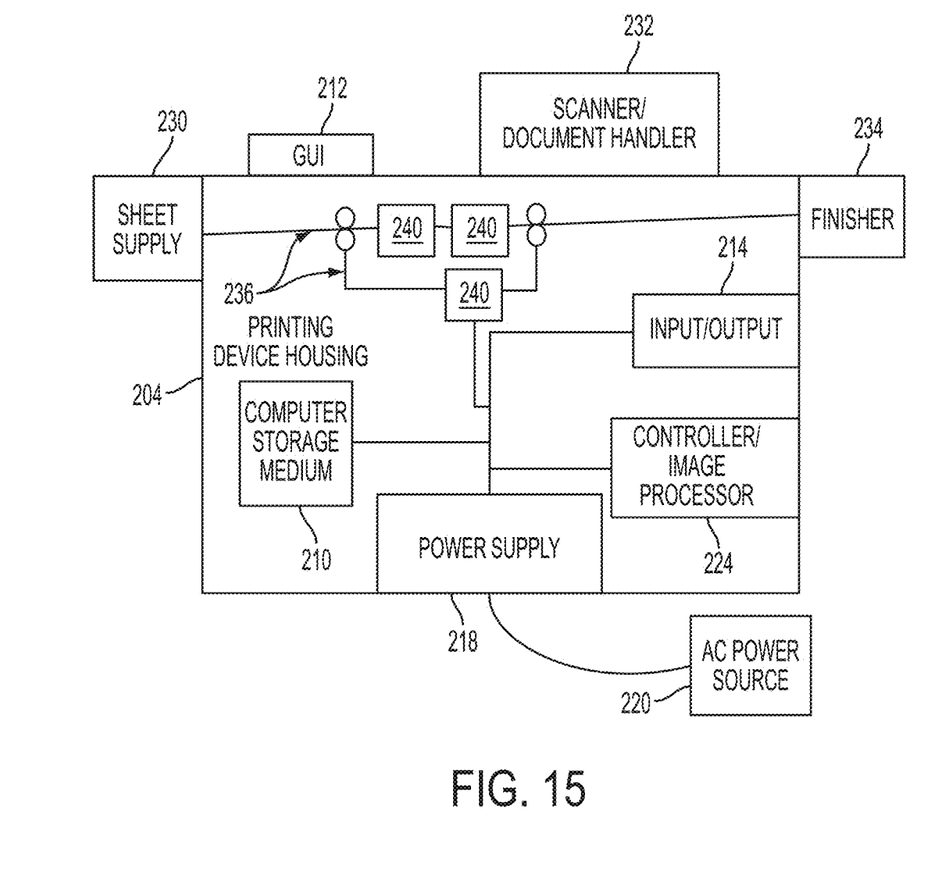
FIG. 15 is a schematic diagram illustrating devices herein.

FIG. 15 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt 248 or an intermediate transfer belt 260 or devices that print directly to print media (e.g., inkjet printers, ribbon-based contact printers, etc.).

As would be understood by those ordinarily skilled in the art, the printing device 204 shown in FIG. 15 is only one example and the systems and methods herein are equally applicable to other types of printing devices that may include fewer components or more components. For example, while a limited number of printing engines and paper paths are illustrated in FIG. 15, those ordinarily skilled in the art would understand that many more paper paths and additional printing engines could be included within any printing device used with systems and methods herein.

Therefore, as shown above, the systems herein include an image processor 224 replacing solid lines of user-fillable areas of a form-based print job with patterned lines. A printing device 240 is operatively (meaning directly or indirectly) connected to the image processor 224. The printing device 240 prints the form-based print job with the patterned lines (to print user-fillable pre-printed forms). An optical scanner 232 is also operatively connected to the image processor 224. The optical scanner 232 scans of at least one of the user-fillable pre-printed forms having user markings thereon to produce a scan. The image processor 224 produces an altered scan from the original scan by removing only lines having the patterned lines from the scan, so as to leave the user markings in the altered scan. The image processor 224 identifies user-supplied characters by performing automated character recognition on the user markings in the altered scan, and then outputs the user-supplied characters.

Devices herein include a communications device 214 operatively connected to a processor 216 and to external devices (e.g., to printer 204) over a network 202. The processor 216 replaces solid lines of user-fillable areas of a form-based print job with patterned lines. The communications device 214 provides electronic instructions to the printing device 204 to cause the printing device 204 to print the form-based print job with the patterned lines to print user-fillable pre-printed forms. The communications device 214 receives a scan of at least one of the user-fillable pre-printed forms having user markings thereon from an optical scanner 232. The processor 216 produces an altered scan by removing only lines having the patterned lines from the scan and leaving the user markings in the altered scan. The processor 216 identifies user-supplied characters by performing automated character recognition on the user markings in the altered scan. The processor 216 outputs the user-supplied characters.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A "pixel" refers to the smallest segment into which an image can be divided. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:
1. A method comprising:
creating a print job by replacing solid lines of user-fillable areas of a form-based print job with patterned lines to have the same dimensions as said solid lines that said patterned lines replace;
printing said print job having user-fillable areas comprising said patterned lines to print user-fillable pre-printed forms using a printing device;
scanning at least one of said user-fillable pre-printed forms having user markings to produce a scan using an optical scanner;
producing an altered scan by removing only said patterned lines from said scan and leaving said user markings in said altered scan using an image processor;

identifying user-supplied characters by performing automated character recognition on said user markings in said altered scan using said image processor; and outputting said user-supplied characters from said image processor.

2. The method according to claim 1, said replacing causing said patterned lines printed on said user-fillable pre-printed forms to be distinguishable from said solid lines by a machine, and said patterned lines printed on said user-fillable pre-printed forms to be indistinguishable from said solid lines by the unaided human eye.

3. The method according to claim 1, said producing said altered scan leaving portions of said user markings that cross said patterned lines in said altered scan.

4. The method according to claim 1, said patterned lines comprising at least one of pixel patterns, and geometric patterns.

5. A method comprising:

providing electronic instructions to an image processor to cause said image processor to automatically replace solid lines of user-fillable areas of a form-based print job with patterned lines, said patterned lines printed on said user-fillable pre-printed forms having the same dimensions as said solid lines that said patterned lines replace;

providing electronic instructions to a printing device to cause said printing device to print said form-based print job with said patterned lines to print user-fillable pre-printed forms;

receiving a scan of at least one of said user-fillable pre-printed forms having user markings thereon into said image processor;

providing electronic instructions to said image processor to produce an altered scan by removing only lines having said patterned lines from said scan and leaving said user markings in said altered scan;

providing electronic instructions to said image processor to identify user-supplied characters by performing automated character recognition on said user markings in said altered scan; and providing electronic instructions to said image processor to output said user-supplied characters.

6. The method according to claim 5, said providing electronic instructions to said image processor to cause said image processor to replace solid lines of said form-based print job with patterned lines causing said patterned lines printed on said user-fillable pre-printed forms to be distinguishable from said solid lines by a machine, and said patterned lines printed on said user-fillable pre-printed forms to be indistinguishable from said solid lines by the unaided human eye.

7. The method according to claim 5, said providing electronic instructions to said image processor to produce said altered scan leaving portions of said user markings that cross said patterned lines in said altered scan.

8. The method according to claim 5, said patterned lines comprising at least one of pixel patterns, and geometric patterns.

9. A system comprising:

an image processor;

a printing device operatively connected to said image processor, said printing device printing a form-based print job having user-fillable areas comprising patterned lines to print user-fillable pre-printed forms, said patterned lines on said user-fillable pre-printed forms being printed to have the same dimensions as solid lines of a pre-printed form that said patterned lines replace; and an optical scanner operatively connected to said image processor, said optical scanner scanning at least one of said user-fillable pre-printed forms having user markings thereon to produce a scan, said image processor producing an altered scan by removing only lines having said patterned lines from said scan and leaving said user markings in said altered scan, said image processor identifying user-supplied characters by performing automated character recognition on said user markings in said altered scan, and said image processor outputting said user-supplied characters.

10. The system according to claim 9, said printing device printing said patterned lines printed on said user-fillable pre-printed forms to be distinguishable from said solid lines by a machine, and said patterned lines printed on said user-fillable pre-printed forms to be indistinguishable from said solid lines by the unaided human eye.

11. The system according to claim 9, said image processor leaving portions of said user markings that cross said patterned lines in said altered scan.

12. The system according to claim 9, said patterned lines comprising at least one of pixel patterns, and geometric patterns.

13. A device comprising:

a processor; and a communications device operatively connected to said processor and to external devices, said processor replacing solid lines of user-fillable areas of a form-based print job with patterned lines to have the same dimensions as said solid lines that said patterned lines replace, said communications device providing electronic instructions to a printing device to cause said printing device to print said form-based print job having said user-fillable areas comprising said patterned lines to print user-fillable pre-printed forms, said communications device receiving a scan of at least one of said user-fillable pre-printed forms having user markings thereon from an optical scanner, said processor producing an altered scan by removing only lines having said patterned lines from said scan and leaving said user markings in said altered scan, said processor identifying user-supplied characters by performing automated character recognition on said user markings in said altered scan, and said processor outputting said user-supplied characters.

14. The device according to claim 13, said processor replacing solid lines of user-fillable areas of a form-based print job with patterned lines causing said patterned lines printed on said user-fillable pre-printed forms to be distinguishable from said solid lines by a machine, and said patterned lines printed on said user-fillable pre-printed forms to be indistinguishable from said solid lines by the unaided human eye.

15. The device according to claim 13, said processor leaving portions of said user markings that cross said patterned lines in said altered scan.

16. The device according to claim 13, said patterned lines comprising at least one of pixel patterns, and geometric patterns.

* * * * *